United States Patent Office 3,801,618
Patented Apr. 2, 1974

3,801,618
PROCESS FOR ALKYL ORTHOSILICATE
James H. Walker, Vallejo, Calif., assignor to Chevron Research Company, San Francisco, Calif.
No Drawing. Filed June 6, 1973, Ser. No. 366,383
Int. Cl. C07f 7/04
U.S. Cl. 260—448.8 A                   1 Claim

ABSTRACT OF THE DISCLOSURE

An improved process for the preparation of alkyl orthosilicate from alkanol and silicon tetrachloride which includes the steps of charging silicon tetrachloride to the reactor after the introduction of alkanol has commenced, maintaining a temperature which achieves a homogeneous system throughout the reaction while removing unreacted alkanol and HCl.

SUMMARY OF THE INVENTION

In the process for the preparation of alkyl orthosilicate with improved yields in shorter times from the reaction between a $C_1$-$C_{20}$ alkanol and silicon tetrachloride in a mol ratio of about 4:1, the improved process comprising the steps of charging silicon tetrachloride to the reactor after the introduction of alkanol was commenced, adjusting the reaction temperature to achieve a homogeneous system, and reducing the contact time of HCl and unreacted alcohol by removing them from the reactor. Laboratory preparations via the revised procedures resulted in yields on the order of 98% orthosilicate and extremely small amounts of di- and polysiloxane by-product.

DESCRIPTION OF PREFERRED EMBODIMENTS

The alkyl orthosilicates find use as functional fluids, hydraulic fluids and coolants. In the improved process for the preparation of alkyl orthosilicate from silicon tetrachloride and alkanol in high yield, the silicon tetrachloride is charged to the reactor after the addition of alkanol has commenced, the temperature is adjusted to maintain a homogeneous reaction system and HCl and unreacted alkanol are removed.

The stoichiometric charge is 4 mols of alkanol per mol of silicon tetrachloride, and the mol ratio of about 4:1 is preferred. The alkanol is first introduced into the reactor to the extent of about 10–40% of the total alkanol charge, the silicon tetrachloride is then charged in its entirety while maintaining a temperature below about 100° F. The remaining alkanol is then added with the temperature increasing to above about 140° F. before about 50% of the total alkanol is charged. All percentages here and elsewhere are weight percentages. The reaction is preferably carried out with sparging by an inert gas such as nitrogen under subatmospheric pressure, preferably at 90–200 mm. Hg, for a period of about 1–5 hours, at a temperature greater than about 140° F., preferably at about 180° F., and most preferably in the range from about 140° F. to not above the boiling point of the alkanol at said pressure. Preferably, residual HCl is neutralized by pressurizing the reactor with ammonia gas for several hours at about 130° F. and about 5 p.s.i.g. Subsequently, the ammonia and other volatiles can be removed by sparging at about 50–200 mm. The crude product can be filtered through a 15-micron filter to remove ammonium chloride before purification by distillation or other means.

While extensive experimental work has been performed on the 2-butyl alkanol reactant, the results are applicable to other $C_1$-$C_{20}$ alkanol reactants in the silicon tetrachloride process for the production of the corresponding alkyl orthosilicate. For example, phase separation has been observed in the production of tetra-2-ethylbutyl orthosilicate. Consequently, the improved process of the present invention is not limited to a particular alkanol or alkyl orthosilicate.

In the old process, silicon tetrachloride was charged to a clean, dry, nitrogen blanketed, glass-lined reactor. The alkanol was then charged with agitation at a temperature below 90° F. for about nine hours. After all the alkanol was charged the reactor was stirred for about one hour at about 90° F. HCl was removed by nitrogen sparging at about 180° F., while the unreacted alkanol was condensed and returned to the orthosilicate reactor. The reactor was cooled to about 100° F. and pressured to about 5 p.s.i.g. with ammonia for about five hours to neutralize trace amounts of HCl. Ammonia was then removed by nitrogen sparging. The crude product was filtered to remove ammonium chloride. The filtrate was distilled and the desired heart cut product removed in the overhead. The alkyl orthosilicate can be purified further by conventional means. The yield based on $SiCl_4$ was generally poor and erratic, varying from 30–60% orthosilicate.

It is believed that low and erratic yields in the preparation of alkyl orthosilicates are the result of deficiencies in the process which allow deleterious side reactions to occur.

To summarize, the loss of silicon tetrachloride early in the process through side reactions with water results in more unreacted alcohol being present in the later stages of the process and the formation of disiloxane and polysiloxane byproducts. Water is formed by long contact times between alcohol and HCl which forms water and alkyl chloride. Holding the reaction temperature at or below 90° F. allows the occurrence of a second polar phase after about one-half the alcohol has been added. Silicon tetrachloride is lost by entrainment from the reactor by the evolving HCl. Furthermore, HCl, in addition to evolving, complexes with the alcohol in the polar phase. Water and HCl facilitate the hydrolysis of the orthosilicate product to di- and polysiloxanes, especially at elevated temperatures.

Thus the low yields of alkyl orthosilicate obtained from the old process can be explained by the presence of water in the reacting mixture, or partially hydrolyzed silicon tetrachloride, e.g., hexachlorodisiloxane, $Cl_3SiOSiCl_3$. Each mol of water or disiloxane in the reaction mixture results in the loss of two mols of tetraalkyl orthosilicate by conversion to hexaalkyl disiloxane or equivalent polysiloxane.

Water can be introduced into the system by inadequate drying of equipment prior to starting operation, introduced with the reactants, introduced mechanically during reaction, or be formed chemically by side reactions. To eliminate all sources of water the following precautions were taken:

(a) the reactor and associated equipment were tested for dryness and watertight operation before and after each run, (b) precautions were taken against the introduction of water with the reactants, (c) precautions were taken against mechanical introduction of water during the preparation.

In spite of all these precautions extremely low yields were erratically obtained in the old process. Ideally, the reaction would be as follows:

$$4ROH + SiCl_4 \rightarrow (RO)_4Si + 4HCl\uparrow \qquad (1)$$

The reaction is believed to occur sequentially as the alkanol is added to the $SiCl_4$, e.g., at 25% alkanol added the major product is believed to be $ROSiCl_3$, and at 75% alkanol added, $(RO)_3SiCl$. The following side reactions are believed to explain the formation of the undesirable di- and polysiloxanes.

$$ROH + HCl \rightarrow RCl + H_2O \qquad (2)$$

$$H_2O + 2SiCl_4 \rightarrow Cl_3SiOSiCl_3 + 2HCl \qquad (3)$$

$$2H_2O + 3SiCl_4 \rightarrow Cl_3SiOSiCl_2OSiCl_3 + 4HCl \qquad (4)$$

$$Cl_3SiOSiCl_3 + 6ROH \rightarrow (RO)_3SiOSi(OR)_3 + 6HCl \qquad (5)$$

$$Cl_3SiOSiCl_2OSiCl_3 + 8ROH \rightarrow (RO)_3SiOSi(OR)_2OSi(OR)_3 + 8HCl, \text{ etc.} \qquad (6)$$

$$(RO)_4Si + HCl \rightleftharpoons (RO)_3SiCl + ROH \qquad (7)$$

$$2(RO)_3SiCl + H_2O \rightarrow (RO)_3SiOSi(OR)_3 + 2HCl \qquad (8)$$

The following examples illustrate an investigation of the side reactions given above which can generate water in situ, and experimental examination of other factors affecting the yield of the process.

EXAMPLE 1

Effect of prolonged contact with HCl

Two laboratory experiments were made following the old procedure to demonstrate the effect on yields of prolonged contact with HCl. In the reaction of 2-butanol with silicon tetrachloride, the processing time was extended to 65 hours at 180° F. in each case. In the first experiment, the crude reaction product was nitrogen blanketed and allowed to stand without removing the HCl or unreacted alkanol. In the second experiment conditions were the same except that the HCl and unreacted alkanol were stripped out before the 65-hour holding time at 180° F. Both products were distilled; heart cut yields were 2% and 76% orthosilicate, respectively.

EXAMPLE 2

Evidence for the formation of alkyl chloride in situ

If a side reaction such as (2) is taken place, the water will be consumed, but the other product, alkyl chloride, should accumulate and be detectable. The following test demonstrates the presence of butyl chloride formed during the process for tetrabutyl orthosilicate. An infrared examination of the forecut fraction from the low yield experiment in Example 1 showed 2-butyl chloride to be present. The entire fraction was redistilled. Of the total overhead, 46% distilled at 68° C., the boiling point of 2-butyl chloride, and infrared analysis confirmed that the product was indeed 2-butyl chloride. With the assumption that one mol of water is formed for each mol of 2-butyl chloride, the amount of water wormed in this experiment would have been 1.57 gram mols (27 grams). The 1.57 gram mols of water would have been sufficient to convert 3.14 gram mols of 2-butyl orthosilicate to disiloxane. Since only 2.3 gram mols of silicon tetrachloride were used in this experiment, the water formed was more than sufficient to convert all of the SiCl₄ to the disilicate and higher silicate polymers.

EXAMPLE 3

Formation of water and alkyl chloride under orthosilicate reaction conditions Ten gram mols (640 g.) of 2-butanol were charged to a 2-liter, glass reactor, nitrogen blanketed, and then saturated with 163 grams of anhydrous HCl. The mixture was stirred at 180° F. for 10 hours. The resulting mixture was then distilled. Three cuts were taken overhead: The first, 68–70° C., was almost pure 2-butyl chloride as determined by infrared analysis; the second and third contained 2-butyl chloride, 2-butanol, and HCl. Each cut was water washed three times to remove the 2-butanol and then the water-insoluble material from each cut was dried. A total of 128 grams (1.39 gram mols) of pure 2-butyl chloride was recovered from the three cuts taken from this reaction. With the assumption that one mol of water is formed for each mol of 2-butyl chloride, the amount of water formed in this experiment would have been 1.39 gram mols (25 grams). The 1.39 gram mols of water would have been sufficient to convert 2.78 gram mols of SiCl₄ or 2-butyl orthosilicate to disiloxane. The data established that 2-butanol and HCl react at processing conditions to form 2-butyl chloride and water.

EXAMPLE 4

Effect of phase separation on yield

In all the laboratory experiments in which 2-butanol was added to the SiCl₄ below 90° F. (old processing condition), phase separation occurred after about 50% of the alkanol had been charged. The transition temperature from two phases to one phase is about 147° F. The two-phase system resulted in poor reactant contact and decreased rate of HCl evolution. It was found in the present work that this two-phase system becomes homogeneous at temperatures above about 147° F. and the evolution of HCl continues at nearly the predicted stoichiometric rate above the transition temperature.

In a first experiment the old processing conditions were used: isothermal reaction at or below 90° F. The initial reaction was extremely rapid, and large volumes of HCl were generated along with some of the volatile SiCl₄ (B.P. 136° F.) which was entrained with the HCl gas. SiCl₄ was lost starting with the initial alkanol addition and continuing until 50% of the alkanol was charged. At this point phase separation occurred and the HCl evolution rate dropped off sharply, virtually stopping after 75% of the alkanol was charged. The heart cut yield from this run was 66% of theoretical.

In the second experiment the old process was modified to eliminate phase separation by increasing the temperature to 190° F. before 50% of the alkanol was charged. In this case the reaction was homogeneous throughout. The HCl evolution rate was nearly constant until 88% of the alcohol had been charged. This reaction still showed some loss of SiCl₄. At the end of the reaction the unreacted alkanol and HCl were quickly distilled out by heating to 300° F. at atmospheric pressure. The heart cut yield from this experiment was 84% with only 2% bottoms product.

EXAMPLE 5

Effect of SiCl₄ vaporization on yield

In order to eliminate the losses of SiCl₄ when the SiCl₄ is charged first and the alcohol is added, the reverse order of charging is used, i.e., SiCl₄ is added to alkanol. This "reverse" charging technique is effective in preventing SiCl₄ losses and results in higher heart cut yields of 75–85% in laboratory experiments. The major drawback to this procedure is the solubility of HCl in alcohol. When the SiCl₄ is charged to all the alcohol, no HCl evolves until 50% of the SiCl₄ is added, presumably because the HCl is solubilized in the unreacted alcohol. After 50% of the SiCl₄ has been charged, HCl begins evolving very rapidly until all the SiCl₄ has been charged. This has the effect of vaporizing all the HCl over the last half of the reaction step. The following experiment demonstrates a modification of the reverse ordering technique that eliminates SiCl₄ losses and is readily adaptable to improving the orthosilicate process.

In this experiment 30% of the 2-butanol charge was charged to the reactor, then all of the SiCl₄ was added below 90° F. This allowed one mol of alkanol to react with each mol of SiCl₄ to form ROSiCl₃. The ROSiCl₃ is much less volatile than SiCl₄, and thus entrainment of SiCl₄ in the HCl is minimized. A gentle release of HCl began after about 15% of the SiCl₄ was added and continued at the theoretical rate until all of the SiCl₄ was charged. As the remaining alkanol was being charged, the temperature was adjusted to reach about 150° F. before 50% of the alkanol had been charged in order to eliminate phase separation. These conditions were then held until all the alcohol had been charged. The results showed that the HCl evolution rate coincided with the theoretical until 97% of the alcohol had been charged and thus that negligible SiCl$_4$ was lost. The unreacted alkanol and HCl were quickly removed by nitrogen sparging at 130 mm. Hg.

apparent to those skilled in the art that numerous modifications and variations of the process can be made in the practice of the invention.

TABLE I.—HYDROLYTIC STABILITY OF TETRA-2-BUTYL ORTHOSILICATE

|  | 2-butanol and HCl | | Water | | Water and HCl | |
| --- | --- | --- | --- | --- | --- | --- |
| Contaminants: | | | | | | |
| Tetra-2-butyl orthosilicate charged, g | 500 | | 500 | | 500 | |
| 2-butanol charged, g | 45 | | None | | None | |
| Water charged, g | None | | 45 | | 45 | |
| HCl charge (saturation), g | 19.9 | | None | | 22.2 | |
| Hours contact at 180° F | 53 | | 53 | | 4 | |
|  | Grams | Percent | Grams | Percent | Grams | Percent |
| Distillation, 20 mm. Hg: | | | | | | |
| Forecut (St to 266° F.) | 91 | 16.5 | 100 | 18 | 374 | 68 |
| Heart cut (266–284° F.) | 303 | 55.5 | 389 | 71 | 0.0 | 0.0 |
| Bottoms (>284° F.) | 145 | 26.5 | 36 | 7 | 187 | 32 |
| Tetra-2-butyl orthosilicate hydrolyzed | 197 | 39 | 111 | 22 | 500 | 100 |
| 2-butyl chloride recovered | 16 | | 0 | | 26 | |

EXAMPLE 6

Effect of product orthosilicate stability on yield

In Table I the effects of (a) HCl and 2-butanol, (b) water, or (c) HCl and water on the stability of 2-butyl orthosilicate are summarized.

To each of three suitable reactors 500 grams of tetra-2-butyl orthosilicate was charged. In the first reactor 45 grams of 2-butanol was added (9.5%), and the mixture was saturated with anhydrous HCl. To the second reactor 45 grams of water was added; and to the third reactor 45 grams of water was added, then saturated with HCl. Both the first and second experiments were nitrogen blanketed and run for 53 hours at 180° F., and the third was run at 180° F. for only 4 hours. Each product was distilled. The loss of orthosilicate after 53 hours in the butanol-HCl run was 39%. The loss from water only run was 22% after 53 hours. In the HCl/water run the orthosilicate was completely lost in just 4 hours. 2-butyl chloride was recovered from the forecut of the first and third experiments in this series. This suggests how easy it is to form the butyl chloride. The bottoms products from the water only and the HCl/water experiments were white, fluffy powders resembling SiO$_2$.

The foregoing examples illustrate the improvements to the process for alkyl orthosilicates which are obtained from the additional steps proposed in the new process. These improvements are chiefly increased and consistent yields of product. While the character of the invention has been explained with several examples this has been done by way of illustration rather than limitation. It is

What is claimed is:

1. In a process of reacting SiCl$_4$ with $C_1$–$C_{20}$ alkanols to form tetra-alkyl orthosilicates, wherein about 4 mols of the alkanol per mol of SiCl$_4$ are employed, the improvement which comprises the sequential steps of (1) introducing the SiCl$_4$ into a body of 10–40% of the total alkanol while maintaining the temperature below 100° F., (2) adding the remaining alkanol with the temperature raised to above about 140 F. before about 50% of the total alkanol is added, and (3) completing the reaction of SiCl$_4$ and alkanol at a sub-atmospheric pressure for 1–5 hours at temperature in the range from about 140° F. to not above the boiling point of the alkanol while sparging the reaction mixture with an inert gas to remove HCl generated in the reaction.

References Cited

UNITED STATES PATENTS

| 2,484,394 | 10/1949 | Van Zwet | 260—448.8 A |
| 2,650,934 | 9/1953 | Rust et al. | 260—448.8 A |
| 3,651,117 | 3/1972 | Bennett | 260—448.8 A X |

DANIEL E. WYMAN, Primary Examiner

P. F. SHAVER, Assistant Examiner

U.S. Cl. X.R.

260—448.8 R